United States Patent
Tang et al.

(10) Patent No.: US 10,643,407 B1
(45) Date of Patent: May 5, 2020

(54) DRIVING EVENT RECORDING METHOD AND SYSTEM FOR NON-IMAGE-BASED CAR ACCIDENT CAUSE DETERMINATION

(71) Applicant: SOUTHERN TAIWAN UNIVERSITY OF SCIENCE AND TECHNOLOGY, Tainan (TW)

(72) Inventors: Ching-Chou Tang, Tainan (TW); Chao-Tang Yu, Tainan (TW); Chien-Liang Hsieh, Tainan (TW); Kun-Yu Li, Tainan (TW); Jhih-Deng Hong, Tainan (TW); Yu-Hao Chung, Tainan (TW); Ming-Ta Wu, Tainan (TW); Sheng-Kai Huang, Tainan (TW); Qing-Yuan Huang, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 16/233,332

(22) Filed: Dec. 27, 2018

(51) Int. Cl.
*G07C 5/08* (2006.01)
*G07C 5/00* (2006.01)
*G06K 9/00* (2006.01)
*B60R 21/013* (2006.01)
*G01S 17/89* (2020.01)
*G01S 17/931* (2020.01)

(52) U.S. Cl.
CPC .......... *G07C 5/0866* (2013.01); *B60R 21/013* (2013.01); *G01S 17/89* (2013.01); *G01S 17/931* (2020.01); *G06K 9/00798* (2013.01); *G06K 9/00805* (2013.01); *G06K 9/00818* (2013.01); *G06K 9/00825* (2013.01); *G07C 5/008* (2013.01)

(58) Field of Classification Search
CPC ............ B60W 2540/30; B60W 40/09; B60W 30/0956; B60W 2750/30; G07C 5/0891
See application file for complete search history.

(56) References Cited

U.S. PATENT DOCUMENTS

| | | | |
|---|---|---|---|
| 2005/0065711 A1* | 3/2005 | Dahlgren | G07C 5/008 701/117 |
| 2010/0129064 A1* | 5/2010 | Maeda | G07C 5/0891 386/241 |

(Continued)

FOREIGN PATENT DOCUMENTS

| | | |
|---|---|---|
| TW | I453615 B | 9/2014 |
| TW | I613108 B | 2/2018 |

*Primary Examiner* — Mirza F Alam
(74) *Attorney, Agent, or Firm* — Rosenberg, Klein & Lee

(57) ABSTRACT

A driving event recording method and system for non-image-based car accident cause determination are disclosed. The system includes an external-event determination unit, an internal-driving-behavior-event determination unit, and a processor electrically connected to both determination units. The method is carried out as follows. The external-event determination unit generates information about an external event, and at the same time the internal-driving-behavior-event determination unit generates information about an internal driving behavior event. The processor receives the external-event information and the internal-driving-behavior-event information and uploads both pieces of information to a cloud storage space in a text or program code format for storage in a blockchain.

7 Claims, 2 Drawing Sheets

(56) References Cited

U.S. PATENT DOCUMENTS

| | | | |
|---|---|---|---|
| 2014/0002277 A1* | 1/2014 | Fulger | G01C 21/3415 340/905 |
| 2018/0061237 A1* | 3/2018 | Erickson | G08G 1/163 |
| 2018/0232639 A1* | 8/2018 | Lin | G06N 3/063 |
| 2019/0126935 A1* | 5/2019 | Phillips | B60W 50/0098 |

* cited by examiner

DRIVING EVENT RECORDING METHOD AND SYSTEM FOR NON-IMAGE-BASED CAR ACCIDENT CAUSE DETERMINATION

BACKGROUND OF THE INVENTION

1. Technical Field

The present invention relates to a driving event recording method and system that provide non-image information for the determination of car accident causes. More particularly, the invention relates to a method and system for converting the information of an event taking place outside a vehicle and of a driving behavior event occurring simultaneously in the vehicle into text or program codes, and storing the text or program code with the blockchain technology.

2. Description of Related Art

Generally, a traffic accident results not from only the conditions outside a vehicle or the driving behavior inside the vehicle, but from a combination of both.

Taiwan Invention Patent No. 1453615, entitled "INTELLIGENT DRIVE RECORDING AND INSPECTION SYSTEM", proposes combining the images generated by a driving recorder with the events sensed by a vehicle sensor (e.g., lane deviation and the detection of a front vehicle) so that the cause of a traffic accident can be determined based on a combination of those images and events. The system of the '615 patent stores the aforesaid images together with the information of driving events that occur while the images are taken, and it can be expected that the images will take up a considerable amount of storage space.

Taiwan Invention Patent No. 1613108, entitled "SYSTEM AND METHOD FOR CAR ACCIDENT-RELATED DRIVING BEHAVIOR ANALYSIS", discloses supplementing the events sensed by a vehicle sensor (e.g., lane deviation and the detection of a front vehicle) with objective information in a road network database and in a traffic database in order to issue a warning about the occurrence of a car accident and, if necessary, generate a comprehensive accident report. As the road network database and the traffic database are used as the source from which to retrieve information about external events, the system and method of the '108 patent cannot identify in real time such external conditions as a pedestrian crossing a street. Moreover, the '108 patent does not disclose how information is stored. If a common information storage method is used (e.g., storing in a cloud database), the information stored is likely to get lost or be tampered with.

BRIEF SUMMARY OF THE INVENTION

To overcome the shortcomings of the prior art, the present invention provides a driving event recording method for non-image-based car accident cause determination, and the method is carried out as follows:

The external-event determination unit of a vehicle generates information about an external event, or external-event information for short. At the same time, the internal-driving-behavior-event determination unit of the vehicle generates information about an internal driving behavior event, or internal-driving-behavior-event information for short. A processor is configured for storing the external-event information and the internal-driving-behavior-event information in a blockchain.

Preferably, the external-event information and the internal-driving-behavior-event information are stored in the blockchain in a text format or a program code format.

Preferably, the external-event determination unit includes a combination of an image capture module and an image analysis module, and the external-event information generated includes information about one or a combination of the following: lane deviation; a warning about collision with a front vehicle; a warning about the distance to, or the time to reach, a front vehicle; the conditions around the vehicle as identified through blind spot detection; a pedestrian around the vehicle as identified through pedestrian detection; a traffic signal or sign identified; a weather condition identified; and a front-vehicle license plate identified.

Preferably, the external-event determination unit includes a combination of an infrared sensing module and an infrared analysis module, and the external-event information generated includes information about the amount of rainfall.

Preferably, the external-event determination unit includes a combination of a LIDAR (light detection and ranging) module and a LIDAR signal analysis module, and the external-event information generated includes information about one or a combination of the following: topography, road geometry, the relative position of an obstacle, and a space where the vehicle can drive through.

Preferably, the external-event determination unit includes a combination of a radar module and a radar signal analysis module, and the external-event information generated includes information about one or a combination of the following: a warning about collision with a front vehicle, the conditions around the vehicle as identified through blind spot detection, and a pedestrian around the vehicle as identified through pedestrian detection.

The present invention further provides a driving event recording system for non-image-based car accident cause determination, wherein the system is integrated into a vehicle and includes an external-event determination unit, an internal-driving-behavior-event determination unit, and a processor. The external-event determination unit is provided in the vehicle to generate external-event information. The internal-driving-behavior-event determination unit is provided in the vehicle to generate internal-driving-behavior-event information concurrently with the external-event determination unit generating the external-event information. The processor is electrically connected to the external-event determination unit and the internal-driving-behavior-event determination unit and is configured for receiving the external-event information and internal-driving-behavior-event information and uploading the external-event information and the internal-driving-behavior-event information to a cloud storage space for storage in a blockchain.

The foregoing technical features can produce the following effects:

1. According to the present invention, the external-event information and the internal-driving-behavior-event information are stored in a text or program code format, which helps save the storage space considerably.

2. Once stored in a blockchain, the external-event information and the internal-driving-behavior-event information are kept from alteration so that the cause of a car accident can be accurately determined by analyzing the driving conditions and driving behaviors revealed by the aforesaid information.

DETAILED DESCRIPTION OF THE INVENTION

The technical features described above are incorporated into a driving event recording method and system for non-image-based car accident cause determination. The major effects of the method and system are illustrated below by way of the following embodiment.

Figure 1:
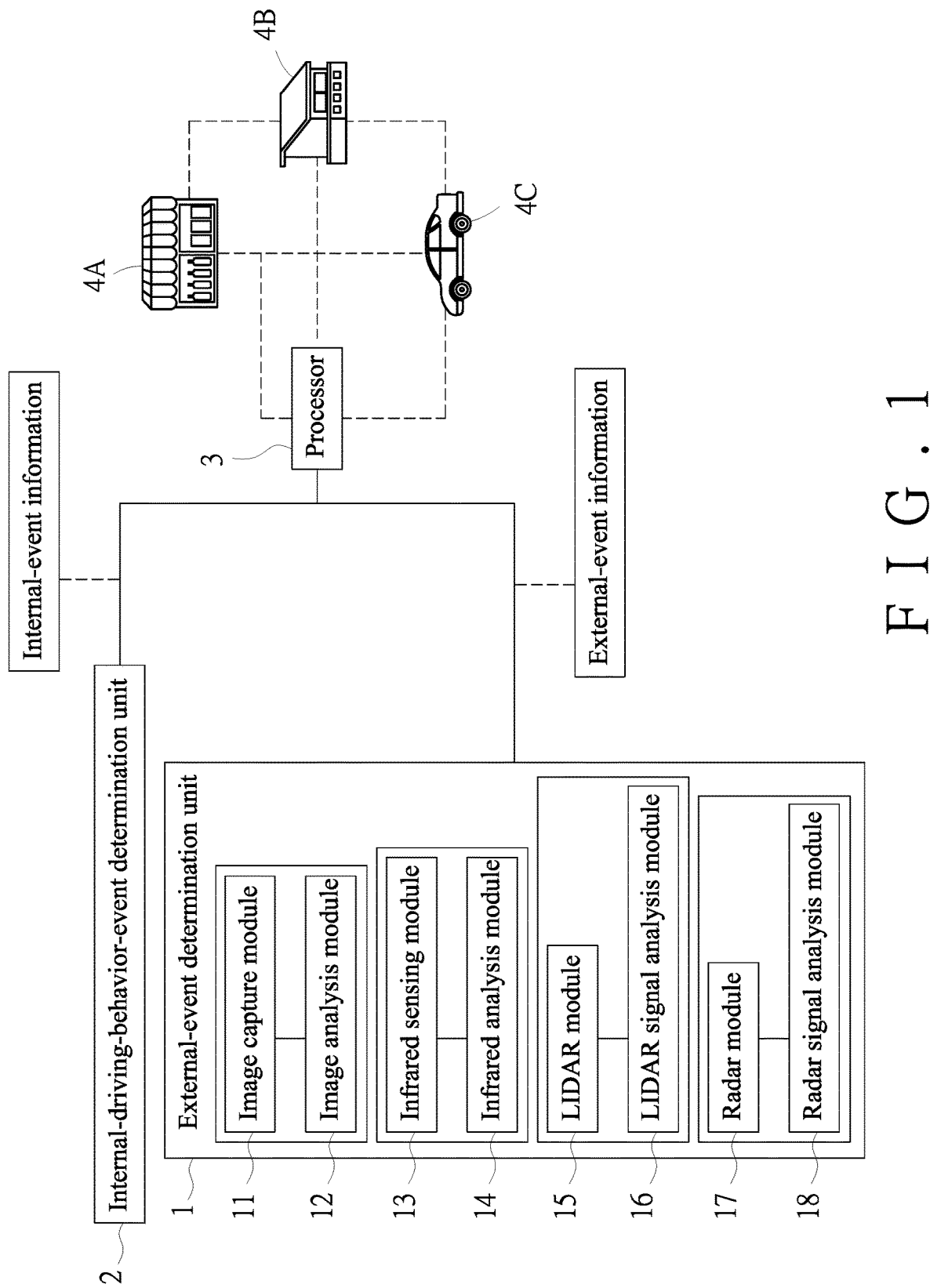
FIG. 1 is a functional block diagram of a system according to the present invention.

Referring to FIG. 1, the driving event recording system for non-image-based car accident cause determination according to an embodiment of the present invention is schematically shown as provided in a vehicle (not shown) and includes an external-event determination unit 1, an internal-driving-behavior-event determination unit 2, and a processor 3. The external-event determination unit 1 includes a combination of an image capture module 11 and an image analysis module 12, a combination of an infrared sensing module 13 and an infrared analysis module 14, a combination of a LIDAR (light detection and ranging) module 15 and a LIDAR signal analysis module 16, and a combination of a radar module 17 and a radar signal analysis module 18 but is not necessarily so configured; more sensing modules may be added as needed. The processor 3 is connected to a plurality of external storage units 4A, 4B, and 4C that form a blockchain.

Figure 2:
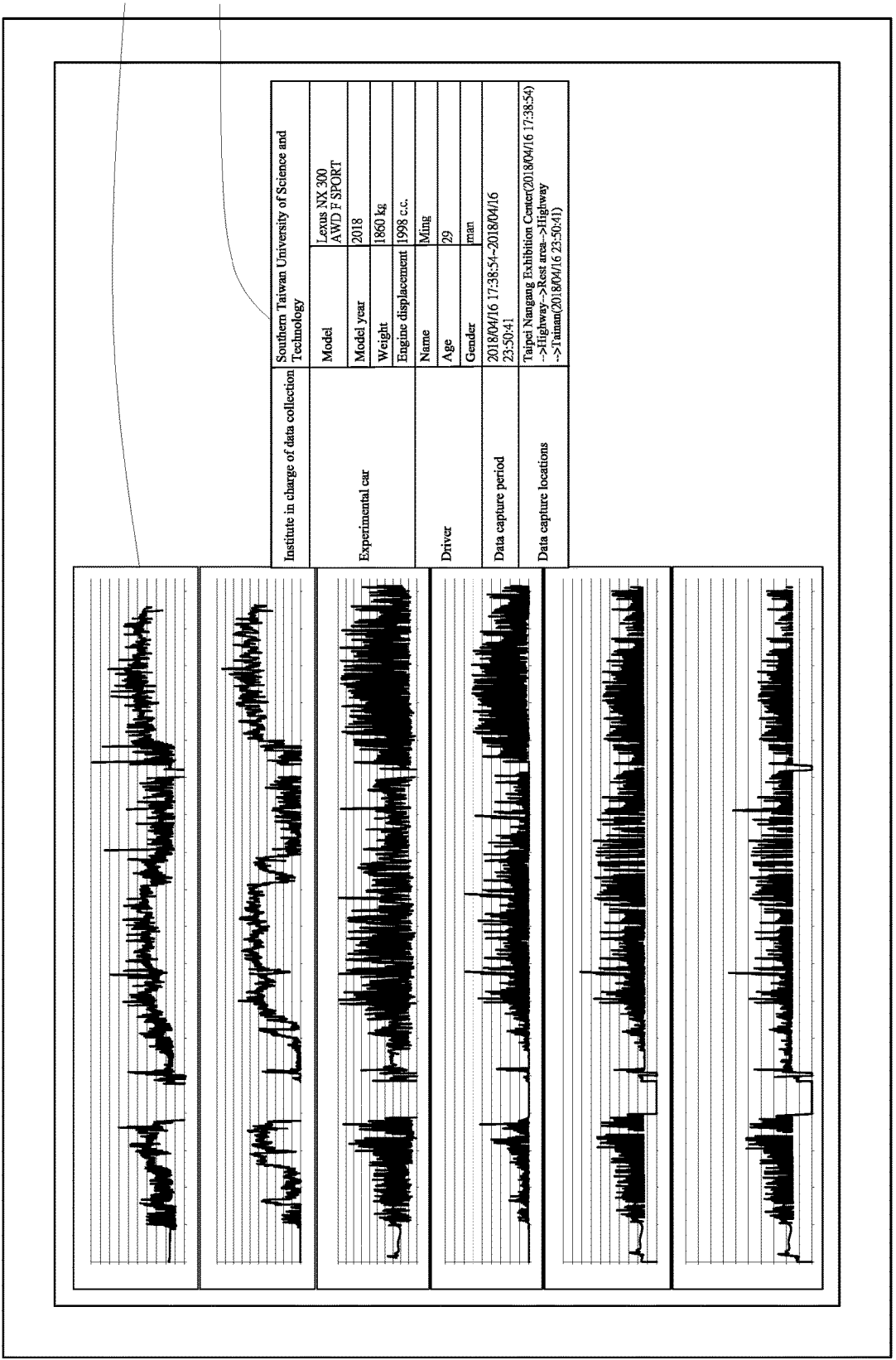
FIG. 2 schematically shows how event information in the present invention is stored in a text format or a program code format.

As shown in FIG. 1 and FIG. 2, the external-event determination unit 1 senses the conditions outside the vehicle and generates information about an external event (hereinafter the external-event information for short). For example, the image capture module 11 may capture an image that shows, or is indicative of, one of the following: lane deviation; collision with a front vehicle; the distance to, or the time to reach, a front vehicle; the conditions around the vehicle as identified through blind spot detection; a pedestrian around the vehicle as identified through pedestrian detection; a traffic signal or sign identified; a weather condition identified; and a front-vehicle license plate identified; and the aforesaid event information is subsequently converted by the image analysis module 12 into text information A and program code-based information B. Similarly, the infrared sensing module 13 may be used to sense the amount of rainfall outside the vehicle, and the infrared analysis module 14 will convert this event information into text information A and program code-based information B; the LIDAR module 15 may be used to sense the surrounding topography, the road geometry ahead, the relative position of an obstacle, or a space through which the vehicle can drive, and the LIDAR signal analysis module 16 will convert the aforesaid event information into text information A and program code-based information B; and the radar module 17 may be used to sense a warning about collision with a front vehicle, the conditions around the vehicle as identified through blind spot detection, or a pedestrian around the vehicle as identified through pedestrian detection, and the radar signal analysis module 18 will convert the aforesaid event information into text information A and program code-based information B. While the external-event determination unit 1 generates the external-event information, the internal-driving-behavior-event determination unit 2 generates information about an internal driving behavior event (hereinafter the internal-driving-behavior-event in formation for short) by sensing the driver's driving behavior. Both the external-event information and the internal-driving-behavior-event information are stored as text information A and program code-based information B to enable highly economic use of the storage space.

The processor 3 stores the external-event information and internal-driving-behavior-event information in a blockchain so that neither of the event information can be tampered with. This helps determine the cause of a car accident accurately by analyzing the driving conditions and driving behaviors revealed by the event information.

The embodiment described above should be able to enable a full understanding of the operation, use, and effects of the present invention. The embodiment, however, is only a preferred one of the invention and is not intended to be restrictive of the scope of the invention. All simple equivalent changes and modifications made according to the appended claims and the disclosure of this specification should be encompassed by the invention.

What is claimed is:

1. A driving event recording method for non-image-based car accident cause determination, comprising:
    establishing for a vehicle an external-event determination unit configured for communication with a processor;
    executing the external-event determination unit to capture external-event information with respect to the vehicle;
    establishing for the vehicle an internal-driving-behavior-event determination unit configured for communication with the processor;
    executing the internal-driving-behavior-event determination unit to capture internal-driving-behavior-event information with respect to the vehicle corresponding in time to the external-event information;
    converting the captured external-event information and internal-driving-behavior-event information to a non-image based representation having at least one of a text format or a program code format; and
    executing the processor for storing the non-image based representation of the external-event information and the internal-driving-behavior-event information in a blockchain.

2. The driving event recording method as claimed in claim 1, wherein the external-event information and the internal-driving-behavior-event information are stored in the blockchain in both the text format and the program code format.

3. The driving event recording method as claimed in claim 1, wherein:
    execution of the external-event determination unit includes a combination of an image capture operation and an image analysis operation, and
    the captured external-event information indicates one or a combination of external events selected from the group consisting of: a lane deviation; a warning about collision with a front vehicle; a warning about a distance to, or a time to reach, a front vehicle; conditions around the vehicle as identified through blind spot detection; a pedestrian around the vehicle as identified through pedestrian detection; a traffic signal or sign identified; a weather condition identified; and a front-vehicle license plate identified.

4. The driving event recording method as claimed in claim 1, wherein:
    execution of the external-event determination unit includes a combination of an infrared sensing operation and an infrared analysis operation, and
    the captured external-event information indicates an amount of rainfall.

5. The driving event recording method as claimed in claim 1, wherein:

execution of the external-event determination unit includes a combination of a LIDAR (light detection and ranging) operation and a LIDAR signal analysis operation, and the captured external-event information indicates one or a combination of external events of a type selected from the group consisting of: topography, road geometry, a relative position of an obstacle, and a space where the vehicle is able to drive through.

6. The driving event recording method as claimed in claim 1, wherein:

execution of the external-event determination unit includes a combination of a radar operation and a radar signal analysis operation, and the captured external-event information indicates one or a combination of external events selected from the group consisting of: a warning about collision with a front vehicle, conditions around the vehicle as identified through blind spot detection, and a pedestrian around the vehicle as identified through pedestrian detection.

7. A driving event recording system for non-image-based car accident cause determination, integrated into a vehicle, the driving event recording system comprising:

an external-event determination unit provided in the vehicle configured for communication with a processor, the external-event determination unit executing to capture external-event information with respect to the vehicle; and an internal-driving-behavior-event determination unit provided in the vehicle configured for communication with the processor, the internal-driving-behavior-event determination unit executing to capture internal-driving-behavior-event information with respect to the vehicle corresponding in time to the external-event information;

wherein the captured external-event information and internal-driving-behavior-event information is converted to a non-image based representation having at least one of a text format or a program code format;

wherein the processor is electrically connected to the external-event determination unit and the internal-driving-behavior-event determination unit and configured to receive and upload the non-image based representation of the external-event information and the internal-driving-behavior-event information to a cloud storage space for storage in a blockchain.

* * * * *